United States Patent [19]

Strobel et al.

[11] 4,148,754

[45] Apr. 10, 1979

[54] PROCESS FOR THE PREPARATION OF A CATALYST AND CATALYST USED IN OLEFIN POLYMERIZATION

[75] Inventors: Wolfgang Strobel, Hofheim; Rainer Franke, Frankfurt am Main, both of Fed. Rep. of Germany

[73] Assignee: Hoechst Aktiengesellschaft, Frankfurt am Main, Fed. Rep. of Germany

[21] Appl. No.: 744,310

[22] Filed: Nov. 23, 1976

[30] Foreign Application Priority Data

Nov. 27, 1976 [DE] Fed. Rep. of Germany ....... 2553179

[51] Int. Cl.$^2$ ............................ C08F 4/02; C08F 4/64
[52] U.S. Cl. ................................ 252/429 C; 252/428; 252/430; 526/129; 526/151; 526/156
[58] Field of Search .................. 252/429 C, 428, 430, 252/441

[56] References Cited

U.S. PATENT DOCUMENTS

| | | | |
|---|---|---|---|
| 3,202,645 | 8/1965 | Yancey | 252/441 |
| 3,787,384 | 1/1974 | Stevens | 252/429 C |

*Primary Examiner*—Winston A. Douglas
*Assistant Examiner*—P. E. Konopka
*Attorney, Agent, or Firm*—Curtis, Morris & Safford

[57] ABSTRACT

When reacting the reaction product of silicon dioxide and/or a metal oxide and a Grignard compound with a soluble titanium compound, there is obtained a catalyst for the polymerization of 1-olefins, which gives a very high yield and allows a good control of the molecular weight by means of hydrogen without making necessary a separation of the excess of metallo-organic compounds and/or the excess of titanium compounds from the catalyst carrier.

30 Claims, No Drawings

PROCESS FOR THE PREPARATION OF A CATALYST AND CATALYST USED IN OLEFIN POLYMERIZATION

The present invention relates to the preparation of a catalyst for the polymerization of ethylene and higher 1-olefins.

A process for the preparation of a catalyst for use in the polymerization of olefins has been described, in which organic alkali metal compounds are allowed to act on the hydroxyl groups of finely dispersed metal oxides, for example silicon dioxide, and the reaction product is reacted subsequently with a metal halide selected from group VII a of the Periodic system, especially manganese hexachloride (cf. U.S. Pat. No. 3,205,177). The solid obtained gives a catalyst suitable for use in the olefin polymerization when combined with a metallo-organic compound the metal of which is selected from one of groups I to III of the periodic system. These catalysts, however, have a low activity and produce only 1.4 kg of polyethylene per gram of manganese in 3 hours at a polymerization temperature of 95° C. and under an ethylene pressure of 98 atmospheres.

A further process comprises impregnating a solid carrier, for example calcium carbonate, with an aluminum-organic compound and treating it subsequently with an excess of titanium tetrachloride, whereby reduced titanium trichloride forms a sediment on the carrier (cf. British Pat. No. 927,969). Thereafter the excess of titanium tetrachloride must be removed. The polymerization activity of the catalysts thus obtained, however, is likewise so low that the residual catalyst must be removed from the polyolefin produced.

Furthermore, there are known catalysts used in the polymerization of olefins, which are obtained by treating an oxide, hydroxide, carbonate or sulfate of magnesium or calcium with an aluminum-organic compound and subsequently reacting the compound obtained with a mixture of halides of titanium and vanadium (cf. German Auslegeschrift No. 2,140,326). In the preparation of these catalysts the aluminum-organic compound and the transition metal compound of titanium and vanadium are used in an amount such that the separation of an excess of these compounds may be dispensed with, but on the other hand, active catalysts for the polyolefin polymerization cannot be obtained when using as transition metal compounds solely titanium compounds. A catalyst, for example, which had been prepared by reacting magnesium oxide with aluminum triethyl and by subsequently treating the product obtained with titanium tetrachloride yielded per hour only 19.5 g of polyethylene per 1 gram of titanium under an ethylene pressure of 39 atmospheres. A secondary treatment of the polyethylene obtained was necessary for removing the residual catalyst because of the discoloration of polyethylene.

Finally a process for the preparation of supported catalysts has been disclosed, in which an excess of a metallo-organic magnesium or aluminum compound is allowed to act on silicon dioxide, aluminum oxide or a mixture consisting of silicon dioxide and aluminum oxide having superficial hydroxyl groups and the reaction product is reacted, after the excess of said organometallic compound has been removed by washing, with an excess of a halogen compound of a transition metal selected from one of groups IVa, Va or VIa of the periodical system, and the excess of the transition metal compound is removed by washing with a solvent. By washing out the metallo-organic compounds of magnesium or aluminum and the transition metals there are formed highly diluted solutions, which must be decomposed subsequently. As a consquence thereof, undesired waste products are obtained, which are contained in the waste water (cf. German Offenlegungsschrift No. 2,109,273).

It has now been found that a catalyst suitable for use in the polymerization of 1-olefins can be obtained by starting from the reaction product of silicon dioxide and/or a metal oxide with a Grignard compound as a carrier and a soluble titanium compound, which catalyst gives high yields and allows a good control of the molecular weight by means of hydrogen without making a separation of the excess of metallo-organic compounds and/or of titanium compounds from the carrier necessary.

The present invention consequently provides a process for the preparation of a catalyst by reacting the reaction product of silicon dioxide and/or aluminum oxide and 1. a halogen-containing magnesium-organic compound and 2. a halogen compound of a transition metal (component A) with a metallo-organic compound (component B), which comprises reacting a silicon dioxide and/or aluminum oxide having a hydroxyl content of from 0.5 to 50 mmols/g first with a magnesium compound of the formula RMgX, in which R is a hydroxarbon radical having from 1 to 20 carbon atoms and X is chlorine, bromine or iodine, in the presence of a diluent, in an amount of from 0.05 to 1 mol of magnesium compound per mol of hydroxyl groups of the carrier and reacting thereafter the solid reaction product in suspension with a halogen-containing titanium (IV) compound of the formula $TiX_n(OR)^1{}_{4-n}$, in which n is an integer of from 1 to 4, X is chlorine or bromine and $R^1$ is a hydrocarbon radical having of from 1 to 12 carbon atoms, in an amount of from 0.01 to 1 mol of titanium compound per mol of hydroxyl groups of the carrier, to obtain the component A.

Suitable carriers are porous oxides or mixed oxides of silicon and/or aluminum having a specific surface of from 50 to 1000 m²/g, preferably from 100 to 800, especially from 150 to 650 and a pore volume in the range of from 0.2 to 2 ml/g, preferably of from 0.4 to 2, especially of from 0.6 to 1.7 ml/g. The particle size is in the range of from 1 to 500 μm, preferably from 10 to 200 μm, especially of from 20 to 100 μm. The number of hydroxyl groups depends on the specific surface and the temperature of the preliminary treatment and is in the range of from 0.5 to 50 mmols preferably of from 1 to 20 mmols, especially of from 1.5 to 10 mmols, hydroxyl groups per gram of carrier. Several of these oxides are prepared especially for being used as a carrier of supported catalysts. They are commercial products.

Prior to the reaction of the hydroxyl groups of the carrier with the halogen-containing magnesium-organic compounds the absorbed water must be removed by drying at a temperature of from 120° to 800° C., preferably of from 200° to 500° C. The number of hydroxyl groups (mmol of hydroxyl groups per gram of carrier) may be modified by said treatment at high temperature, whereby it is reduced with an increasing temperature.

After drying the carrier is kept under an inert gas atmosphere, for example nitrogen or argon, with the exclusion of air or water.

Suitable halogen-containing magnesium-organic compounds are compounds of the formula RMgX, in which R is a hydrocarbon radical having from 1 to 20, preferably from 2 to 10 carbon atoms and X is chlorine, bromine or iodine. These compounds are known as Grignard compounds and may be prepared, for example by reaction of metallic magnesium with a halogenhydrocarbon having from 1 to 20, preferably from 2 to 10 carbon atoms, for example an alkyl,-cycloalkyl-or arylhalide, in the presence of a nucleophilic solvent, for example an ether (cf. Organikum, VEB Deutscher Verlag der Wissenschaften, Berlin, 1964, page 466). These compounds may also be prepared in a hydrocarbon in the absence of an ether. Preferred magnesium compounds are ethyl magnesium chloride, n-propyl magnesium chloride, i-propyl magnesium iodide, n-butyl magnesium chloride, t-butyl magnesium chloride, phenyl and magnesium bromide. n-Propyl magnesium chloride and n-butyl magnesium chloride are particularly preferable.

The Grignard compound reacts in known manner with the hydroxyl groups placed at the surface of the carrier at a temperature below 100° C. while splitting off hydrocarbon, with the addition of —MgX to the oxygen of the hydroxyl group according to the following equation:

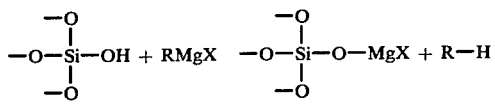

Consequently one mol of magnesium alkyl chloride is chemically bound per mole of hydroxyl groups of the carrier. The number of hydroxyl groups of the carrier may, consequently, be determined by volumetric or chromatographic analysis of the hydrocarbon formed or by retitration of the excess of Grignard compound.

The reaction of the solid carrier with the Grignard compound may be carried out in the following way: The solid carrier is suspended in an inert diluent, the dissolved Grignard compound is added at a temperature of from −20° to 150° C., preferably of from 0° to 120° C., especially of from 20° to 100° C., and allowed to act on the suspension for a period of from 0.5 to 20, preferably from 0.5 to 10, especially from 0.5 to 2, hours. The proportion of Grignard compound and solid carrier is chosen such that from 0.05 to 1, preferably from 0.1 to 0.95, mol of alkyl magnesium halide is used per mole of hydroxyl groups of the carrier. The magnesium compound is applied on the carrier quantitatively in said process. The reaction is completed when no more magnesium can be detected in the supernatant solution after the solid carrier has settled.

Suitable diluents are all solvents inert with regard to Grignard compounds, for example saturated hydrocarbons or ethers, for example pentane, hexane, heptane, diethyl ether, tetrahydrofurane, or mixture of both types of compounds.

After completion of the above reaction the diluent is separated by filtration and drying or directly by distillation, at a temperature of from 50° to 200° C., if it contains an ether. The separation of the diluent is necessary for removing the ether, which has been used for the preparation of the Grignard compound and formed a complex with said compound, owing to the fact that the ether also reacts with the titanium compound while forming a complex and deactivates the catalyst.

The separated diluent may be reused after having been recovered.

The solid carrier impregnated with the Grignard compound is thereafter suspended again in an inert dispersing agent, preferably in an inert hydrocarbon. A dispersing agent conventionally used for the polymerization under low pressure according to Ziegler is chosen preferably.

When not an ether but a saturated hydrocarbon is used for the preparation of the Grignard compound, the diluent need not be separated and the titanium(IV) compound may be directly added to the reaction mixture. Suitable inert dispersing agents are aliphatic or cycloaliphatic hydrocarbons, for example pentane, hexane, heptane, cyclohexane, methylcyclohexane as well as aromatic hydrocarbons, for example benzene, toluene, xylene, and furthermore benzine or Diesel oil fractions, which have been carefully purified of oxygen, sulfur compounds and moisture, may be used.

To the suspension obtained there is added subsequently a halogen-containing titanium(IV) compound, at a temperature of from 20 to 140° C., preferably of from 30 to 130° C., especially of from 40 to 120° C. and the mixture is stirred at this temperature until a titanium compound can no longer be detected in the suernatant solution, generally within a period of from 2 to 20 hours.

The halogen-containing titanium(IV) compound is a compound of the formula $TiX_n (OR^1)_{4-n}$, wherein n is an integer of from 1 to 4 and X is chlorine or bromine and $R^1$ is a hydrocarbon radical, preferably an alkyl, aryl or aralkyl radical having from 1 to 12, preferably from 1 to 8 carbon atoms, especially a straight chain or branched alkyl radical having from 1 to 8 carbon atoms, for example $TiCl_4$, $TiCl_3$, $(O-n-C_3H_7)$, $TiCl_2(O-n-C_3H_7)_2$, $TiCl(O-n-C_3H_7)_3$, $TiCl_2(O-1-C_3H_7)_2$, $TiCl_3(O-i-C_3H_7)$, $TiCl_3(O-CH_2C_6H_5)$, $TiCl_2(O-CH_2C_6H_5)_2$, $TiCl_3(O-i-C_4H_9)$ and $TiCl_2(O-i-C_4H_9)_2$.

Titanium tetrachloride, $TiCl_2(O-i-C_3H_7)_2$ and $TiCl_3(O-i-C_3H_7)$ are used preferably.

The proportion between the titanium compound and the solid carrier is chosen such that of from 0.01 to 1, preferably of from 0.05 to 1, especially of from 0.1 to 1, mol of titanium compound is used per 1 mole of hydroxyl groups of the solid carrier.

The proportion of, Grignard compound to the titanium compound is chosen such that the atomic ratio of magnesium to titanium in the catalyst component A is in the range of from 0.01 to 10, preferably of from 0.05 to 5, especially of from 0.1 to 2.

The catalyst component A thus obtained is used either directly in the form of the suspension or after removal of the diluent and drying.

Suitable compounds for the component B are organic compounds of the metals selected from one of the main groups I, II and III of the periodic system. Aluminumorganic compounds are preferably used as component B.

Suitable aluminum-organic compounds are the reaction products of aluminum-trialkyls or aluminum dialkyl hydrides, containing alkyl radicals having from 1 to 16 carbon atoms, with dienes having from 4 to 20 carbon atoms. The reaction products of aluminum trialkyls or aluminum-dialkyl hydrides, the alkyl radicals of which have from 4 to 8 carbon atoms, for example phellandrene of a diene of the formula

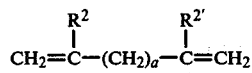

wherein $R^2$ and $R^{2'}$is hydrogen, an alkyl radical, an alkylene radical having a non-terminal double bond or a mononuclear aryl radical and a is 0 or 1, are used preferably. There may be mentioned, by way of example, 1,4-butadiene, isoprene, 2-phenyl butadiene, 1,4-pentadiene, 1,3-pentadiene and myrcene. The reaction products of $Al(i-C_4H_9)_3$ or $Al(i-C_4H_9)_2H$ with isoprene are used preferably. They comprise, for example, compounds of the formula

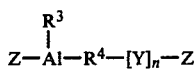

wherein Y means the groups

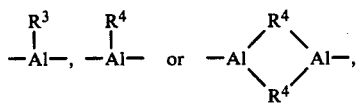

Z is hydrogen, the isobutyl group, the dihydroisoprenyl group or an oligomer of this group, $R^3$ is the isobutyl radical, $R^4$ is the tetrahydroisoprenylene radical and n is an integer of from d1 to 20, the compounds of the formula

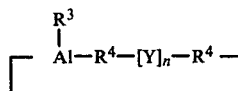

wherein Y, $R^3$ and $R^4$ and n are defined as above. The ratio between $C_5$ and $C_4$ radicals in the reaction products of $Al(i-C_4H_9)_3$ or $Al(i-C_4H_9)_2H$ with isoprene may generally be in the range of from 0.25 to 10, preferably 1 to 4. A compound of this type being commercially available under the name "aluminum isoprenyl" is used particularly preferable.

Further suitable compounds for component B are chlorine-containing aluminum-organic compounds, for example dialkyl aluminum monochlorides of the formula $R^5_2AlCl$ or alkyl aluminum sesqui-chlorides of the formula $R^5_3Al_2Cl_3$, wherein $R^5$ is a hydrocarbon radical having from 1 to 16 carbon atoms, preferably an alkyl radical having from 1 to 16, especially from 2 to 12 carbon atoms. There may be mentioned, by way of example $(C_2H_5)_2AlCl$, $(i-C_4H_9)_2AlCl$, $(C_2H_5)_3Al_2Cl_3$.

Especially suitable compounds for the component B are aluminum trialkyls of the formula $AlR^5_3$ or aluminum dialkyl hydrides of the formula $AlR^5_2H$, wherein $R^5$ is a hydrocarbon radical having from 1 to 16 carbon atoms, preferably an alkyl radical having from 1 to 16, especially from 2 to 4 carbon atoms, for example $Al(C_2H_5)_3$, $Al(C_2H_5)_2H$ $Al(C_3H_7)_2H$, $Al(i-C_4H_9)_3$, $Al(i-C_4H_9)_2H$.

The conversion of the titanium(IV) compound of component A into the polymerization active compound having a lower valency is advantageously performed during the polymerization by the metallo-organic compound (component B) at a temperature of from 20° to 150° C., preferably of from 60° to 140° C.

Component A may also be treated with a metallo-organic compound prior to polymerizing and be used subsequently in the polymerization at a temperature of from −30 to 150° C., preferably of from 0 to 100° C., with a molar ratio between metallo-organic compound and titanium compound of from 0.2:1 to 3:1, preferably from 0.5:1 to 2:1. If a chlorine-containing metallo-organic compound is used it is advisable to wash the reaction product obtained with fresh dispersing agent. Thereafter it is activated with a further metallo-organic compound at a temperature of from 20 to 150° C.

When using the catalyst according to the invention at least one 1-olefin of the formula $R^6$—CH=$CH_2$, wherein $R^6$ is hydrogen or a straight chain or branched alkyl radical having from 1 to 10, preferably from 1 to 8, carbon atoms, is polymerized. Examples of such olefins are ethylene, propylene, butene-1, hexene-1, 4-methyl-pentene-1, octene-1. Ethylene is preferably polymerized alone or as a mixture consisting of at least 70% by weight of ethylene and at most 30% by weight of a further 1-olefin of the above formula. Ethylene is especially polymerized either alone or as a mixture of at least 92% by weight of ethylene and at most 8% by weight of a further 1-olefin of the above formula.

The molecular weight of the polymer is controlled in known manner, preferably by using hydrogen.

The polymerization may be carried out in solution, in suspension or in the gaseous phase, continuously or discontinuously, at a temperature of from 20 to 150° C., preferably of from 60 to 140° C., under a pressure of from 0.5 to 50 bars. It is carried out preferably under the technically interesting pressure in the range of from 1 to 40 bars.

Thereby the titanium compound is used in a concentration of from 0.005 to 1.5, preferably of from 0.05 to 1, mmol per liter of dispersing agent or reactor volume. The metallo-organic compound is used in a concentration of from 0.5 to 10 mmols, preferably of from 2 to 6 mmols, per liter of dispersing agent or reactor volume. Higher concentrations are also possible principally.

The polymerization in suspension or solution is carried out in a conventional inert solvent for low pressure processes according to Ziegler, which have been described above.

The process according to the invention has the advantage that excessive metal compounds do not have to be removed from the catalyst component A by washing, owing to the fact that both the halogen-containing magnesium-organic compound used and the halogen-containing titanium(IV) compound react completely with the carrier. Consequently, no washing liquids are formed from which the metal compounds must be separated prior to the secondary treatment. As a consequence thereof there are formed no metal-containing waste water or slurries. During the polymerization of ethylene and higher 1-olefins the catalyst according to the invention gives high catalyst yields under low pressure, for example of from 1 to 7 bars, such that the magnesium/titanium and aluminum compound may completely remain in the polymer; a discoloration of the polyolefin or corrosion phenomena on the processing machines do not occur. Thus expensive operations such as a decomposition of the catalyst and a removal of the catalyst may be dispensed with. Carrying out the polymerization under a higher pressure permits use of a still smaller quantity of catalyst, as the catalyst yield is highly improved with an increasing polymerization pressure.

The catalyst according to the invention is especially suitable for the polymerization of ethylene in the gaseous phase in a fluidized bed. The use of oxide carriers having a particle size of more than 30 μm, which may be obtained for example by separating fine particles by sieving, prevents finely divided catalysts or polymer parts from being carried out of the fludized bed and forming deposits in exterior zones of the reactor.

The catalyst according to the invention permits preparation of a polymer, the powder in bulk of which has a high air permeability and thus may directly be used in the processing by injection molding or extrusion without previous granulation. A good air permeability of the powder in bulk in the extruder feeding zone prevents an incorporation of air into the molten polymer, which would cause a formation of bubbles in the finished part.

The porous silicon dioxide having one or more surface OH groups is designated as "silicic acid" in the examples.

For determining the number of hydroxyl groups of the carrier 10.0 g of the dried silicic acid are reacted under an argon atmosphere while refluxing and stirring with a solution of 500 mmols of n-propyl magnesium chloride in 500 ml of diethyl ether, for a period of 4 hours. After settling of the silicic acid magnesium is retitrated in the supernatant solution by way of complexometry.

The titanium content of component A is determined colorimetrically by using hydrogen peroxide (cf. G. O. Muller, Praktikum der quantitativen chemischen Analyse, 4th edition, (1957), page 243).

For the polymerization in suspension there is used a hydrated Diesel oil fraction having a boiling range of from 140 to 200° C.

The melt index of the polymer is determined according to DIN (German Industrial Standard) 53,735, at 190° C., by using a load of 5 kg for $i_5$ and of 15 kg for $i_{15}$.

The reduced specific viscosity (RSV) is determined with a solution of decahydronaphthalene at 135° C. at a concentration of 1 g/b 1.

The bulk density is determined by weighing 100 cm³ of polyethylene powder.

The air permeability is determined in the following manner: 100 cm³ of polyethylene powder are placed in a graduated cylinder, which has an inner diameter of 3 cm and a fritted glass bottom, and air suctioned through the powder at a rate of flow of 4 l/h; the pressure decrease occuring in the powder in bulk is determined. The air permeability is then determined in the following manner:

$$\text{air permeability } (L) = \frac{\text{height of the package} \times \text{flow velocity}}{\text{diameter of the cylinder} \times \text{pressure loss.}}$$

In the present invention L is 0.023/Δ p − 1, whereby Δ p is millimeters of the water column and 1 mm water column corresponds to the pressure loss of the glass frit. The diamension of L is (cm³ · . sec/g).

All solvents are distilled under an inert gas atmosphere having a purity of at least 99.995% in a circulation apparatus while passing over benzophenone potassium and are withdrawn under an inert gas atmosphere. The preparation of the catalyst and the polymerization of ethylene are carried out under an argon atmosphere or under an atmosphere of purified nitrogen while carefully excluding air and humidity.

The following examples illustrate the invention.

EXAMPLE 1

A silicic acid having a specific surface of about 300 m²/g, a pore volume of 1.65 cm³/g, and an average particle size of 70 μm is dried for 6 hours in a fluidized bed at 460° C. under an argon atmosphere and kept under an argon atmosphere. The number of hydroxyl groups is 1.7 mmols of hydroxy groups per 1 g of silicic acid.

107 g of this silicic acid are suspended in 500 ml of nheptane under an argon atmosphere, 343 ml of a solution of 172 mmols of n-propyl magnesium chloride (1.6 mmols of magnesium per 1 g of silicic acid) in diethyl ether are added and the mixture is heated for 4 hours to 50° C. The solvent is withdrawn thereafter in a rotary evaporator and the solid product is dried for 2 hours at 120° C. under 0.5 torr. Thereafter the solid product is suspended in 500 ml of n-heptane under an argon atmosphere, 20.3 g of titanium tetrachloride (1.0 mmol of titanium per 1 g of silicic acid) are added and the mixture is stirred for 7 hours at 90° C. Heptane is thereafter withdrawn at 120° C. in the rotary evaporator under atmospheric pressure. 128 g of a flowable powder is obtained.

The titanium analysis reveals 39.8 mg of titanium per 1 g of the component A. The atomic ratio of magnesium/titanium is 1.6:1.

500 ml of Diesel oil are introduced into a 1 liter autoclave provided with a flat blade agitator, the air is displaced by evacuating and introducing nitrogen under pressure three times and the autoclave is heated to 85° C. 1.14 g of aluminum triethyl and 0.12 g of the catalyst component A are added. Hydrogen is then introduced until a pressure of 2 bars is attained and ethylene is introduced in an amount sufficient to maintain a total pressure of 5.9 bars. After 2 hours of polymerization at 85° C. the polyethylene powder is separated from the dispersing agent by filtration and dried for 15 hours at 95° C. in vacuo. 115 g of polyethylene are obtained having an $i_5$ value of 9.3 and a bulk density of 330 g/l.

The yield of polyethylene was 24,000 g per 1 g of titanium or 958 g per 1 g of the catalyst component A.

EXAMPLE 2

Ethylene is polymerized in the presence of 0.22 g of the catalyst component A described in Example 1 under the same conditions as in Example 1, but by using instead of aluminum triethyl 1.98 g of aluminum triisobutyl. After 2 hours there are obtained 145 g of polyethylene having a melt index $i_5$ of 7.9 and a bulk density of 350 g/l. The RSV value is 1.84 g dl/g. There are obtained per 1 gram of titanium 16,600 g of polyethylene and per gram of the catalyst component A, 659g.

EXAMPLE 3

Polymerization of ethylene in the gaseous phase.

2 kg of polyethylene ($i_5$=10.8, bulk density 410 g/l) are introduced into a lying 80 liter reactor provided with a scraping stirrer. The reactor is liberated from air by evacuating several times and by flushing for several hours with an ethylene-hydrogen mixture and is heated thereafter to 90° C. 17.1 g of aluminum triethyl and 2.41 g of the catalyst component A prepared according to Example 1 are added. 2 kg of ethylene/hour and hydrogen are introduced for a period of 6 hours until the hydrogen portion is 20% by volume. The polymerization temperature is 95° C. The pressure mounts to 10.7 bars in the course of the reaction. There are obtained 14 kg of polyethylene having a melt index $i_5$ of 0.95 and a bulk density of 435 g/l. A sieve analysis reveals a fine portion of 0.2% by weight below 100 μm and 0% by weight below 50 μm. 125,000 g of polyethylene per gram of titanium and 5,809 g of polyethylene per gram of the catalyst component A are obtained.

COMPARATIVE EXAMPLE A

The example demonstrates that the catalytic activity is not improved when using an excess of titanium tetrachloride under the conditions indicated in Example 1, while washing several times the excess of titanium component.

10.0 g of the silicic acid treated previously with the Grignard compound according to Example 1 are suspended in 50 ml of n-heptane per gram of silicic acid) for a period of 6 hours at 90° C. while stirring under an argon atmosphere. The insoluble solid matter is washed eight times by decanting and stirring with each 80 ml of n-heptane until 10 ml of the supernatant solution contains less than 0.001 mmol of titanium compound. Heptane is then withdrawn in the rotary evaporator at 120° C. There are obtained 9.7 g of a flowable powder, which contains 40.1 mg of titanium per gram.

Ethylene is polymerized with 01.12 g of the powder obtained under the same conditions as in Example 1. There are obtained 80 g of polyethylene having a melt index $i_5$ of 5.7 and a bulk density of 295 g/l. There are obtained 16,600 g of polyethylene per gram of titanium and 666 g per gram of the catalyst component A.

COMPARATIVE EXAMPLE B

The example demonstrates that the activity of the catalyst is not improved when using an excess of the Grignard and titanium compound during the catalyst preparation and when removing the excess of magnesium and titanium compounds by washing several times.

6.6 g of the dried silicic acid according to Example 1 are suspended in 25 ml of n-heptane, 66 ml of a solution of 33 mmols of n-propyl magnesium chloride (5 mmols per 1 gram of silicic acid) in diethyl ether are added and the mixture is refluxed for 4 hours. The insoluble solid matter is washed three times, each with 80 ml of diethyl ether, and two times, each with 80 ml of n-heptane, by decanting and stirring until no more magnesium can be detected in the separated solution. The solvent is then removed in the rotary evaporator under 1 torr at 150° C.

The pulverulent solid is suspended in 50 ml of n-heptane, mixed with 7.9 g of titanium tetrachloride (6.3 mmols per 1 gram of silicic acid) and stirred for 7 hours at 90° C. The insoluble solid is then washed five times, each time with 80 ml of n-heptane, by decanting and stirring, until less than 0.001 mmol of titanium compound are contained in the supernatant solution. Heptane is then withdrawn at 120° C. in the rotary evaporator. There are obtained 5.8 g of a flowable powder, which contain 27.6 mg of titanium per gram. The atomic ratio between magnesium and titanium is 2.6:1.

Under the same conditions as in Example 1 ethylene is polymerized while using 0.31 g of the catalyst component A. There are obtained 166 g of polyethylene having a melt index $i_5$ of 4.0 and $i_{15}$ of 21.6. The bulk density is 310 g/l. Per gram of titanium there are obtained 19,400 g of polyethylene and per gram of the catalyst component A, 535 g.

EXAMPLE 4

7.2 g of the silicic acid dried according to Example 1, which has been reacted with n-propyl magnesium chloride, are suspended in 50 ml of n-heptane. 1.73 g of titanium tetrachloride (1.27 mmols per 1 g of silicic acid) are added and the reaction mixture is heated for 7 hours at 90° C. while stirring. Heptane is withdrawn in the rotary evaporator and the residue is dried for 2 hours at 120° C. under atmospheric pressure and for 0.5 hour at 80° C. under 0.5 torr. 8.3 g of catalyst component A are obtained. The titanium analysis reveals 45.8 mg of titanium per 1 g of the component A. The magnesium/titanium atomic ratio is 1.3:1.

500 ml of Diesel oil are introduced into a 1 liter autoclave provided with a flat blade agitator, the air is displaced by evacuating and introducing nitrogen under pressure several times and the contents of the autoclave are heated to 85° C.; 10 mmols of a solution of aluminum isoprenyl (reaction product of isoprene and aluminum triisobutyl having an aluminum content of 15 to 16% by weight and a $C_5/C_4$ of 2.5:1 after hydrolysis) are added. 0.25 g of catalyst component A are then added. Hydrogen is introduced until a pressure of 2 bars is attained and ethylene is added in an amount sufficient to maintain a total pressure of 5.9 bars. After 2 hours the polyethylene powder is separated from the dispersing agent by filtration and dried for 15 hours at 95° C. in vacuo. There are obtained 237 g of polyethylene having a melt index $i_5$ of 5.2 and $i_{15}$ of 28.1. The RSV value is 1.8 dl/g. The bulk density is 360 g/l, the air permeability 0.0058 cm$^3$·sec/g. The sieve analysis reveals a portion of fine particles having a diameter of less than 100 μm of 0.5% by weight. There are obtained 20,700 g of polyethylene per gram of titanium and 948 g per gram of the catalyst component A.

EXAMPLE 5

Polymerization of ethylene in the gaseous phase.

Ethylene is polymerized in the gaseous phase in the presence of 2.09 g of the catalyst component A prepared according to Example 4 under the conditions of Example 3. After 6 hours the pressure set up is 9.8 bars. There are obtained 14,000 g of polyethylene having a melt index $i_5$ of 0.78 and a bulk density of 395 g/l. The portion of fine particles having a diameter below 100 μm is 0.4% by weight. There are obtained 125,000 g of polyethylene per gram of titanium and 6.698 g of polyethylene per gram of the catalyst component A.

EXAMPLE 6

8.6 g of the dried silicic acid according to Example 1 are suspended in 50 ml of diethyl ether, 13.7 ml of a solution of 6.8 mmols (0.79 mmol per 1 gram of silicic acid) of n-propyl magnesium chloride in diethyl ether are added and the mixture is refluxed for 3 hours. The solvent is withdrawn in the rotary evaporator and the residue is dried for 2 hours at 150° C. under 1.5 torrs. The dried free flowing powder is suspended in 50 ml of n-heptane, mixed with 1.65 g of titanium tetrachloride (1.0 mmol per 1 gram of silicic acid) and heated for 7 hours at 90° C. while stirring. The solvent is then withdrawn at 120° C. in the rotary evaporator and the residue is dried for 0.5 hour at 80° C. under 1 torr. 9.6 g of the free flowing catalyst component A is obtained, which contains 40.1 mg of titanium per gram.

The atomic ratio of magnesium/titanium is 0.8:1. Ethylene is polymerized under the conditions of Example 1 in the presence of 0.37 g of the component A. 215 g of polyethylene are obtained having a melt index $i_5$ of 1.7 and $i_{15}$ of 9.5. The bulk density is 348 g/l. Per gram of titanium there are obtained 14,500 g, per gram of the component A, 581 g of polyethylene.

EXAMPLE 7

Into a 1 liter autoclave made from stainless steel there are introduced 500 ml of Diesel oil, and the air is displaced by evacuating and by introducing nitrogen under pressure three times. Thereafter the autoclave is heated to 85° C. 1.14 g of aluminum triethyl and 0.12 g of the catalyst component A prepared according to Example 6 are added. Hydrogen is introduced until a pressure of 5 bars is attained and ethylene is introduced in an amount sufficient to maintain a total pressure of 16.7 bars. After 2 hours of polymerization at 85° C. the polyethylene powder is separated by filtration from the dispersing agent and dried for 15 hours at 95° C. in vacuo. 203 g of polyethylene are obtained having a melt index $i_5$ of 1.1 and a bulk density of 430 g/l. The air permeability of the polyethylene powder is 0.012 cm$^3$·sec/g. The sieve analysis reveals a portion of fine particles having a diameter below 100 μm of less than 0.1% by weight. Per gram of titanium there are obtained 42,200 g of polyethylene, per gram of the catalyst component A, 1,692 g.

EXAMPLE 8

The catalyst is prepared in analogous manner to Example 6, but by reacting 7.9 g of the dried silicic acid with 6.3 ml of a solution of 3.2 mmols of n-propyl magnesium chloride (0.4 mmols per 1 gram of silicic acid) in diethyl ether. Thereafter the product obtained is reacted with 1.5 g of titanium tetrachloride (1.0 mmol per 1 gram of silicic acid). There are obtained 9.0 g of a flowable catalyst component A which contains 39.9 mg of titanium per gram. The atomic ratio of magnesium/titanium is 0.41:1.

Ethylene is polymerized in the presence of 0.44 g of the powder obtained under the same conditions as in Example 1. There are obtained 182 g of polyethylene powder having a melt index $i_5$ of 1.7 and $i_{15}$ of 12.9. The bulk density is 285 g/l. Per gram of titanium there obtained 10,400 g of polyethylene, per gram of the catalyst component A, 414 g.

EXAMPLE 9

Ethylene is polymerized under the same conditions as in Example 2 in the presence of 0.54 g of the catalyst component A prepared according to Example 8. There are obtained 193 g of polyethylene having a melt index $i_5$ of 0.44 and $i_{15}$ of 3.6. The RSV value is 2.88 gl/g, the bulk density about 305 dl. Per gram of titanium there are obtained 9,000 g of polyethylene, per gram of the component A, 357 g.

COMPARATIVE EXAMPLE C

The Example demonstrates that the catalysts obtained are not very active, when using a silicic acid which has not been treated preliminarily with the Grignard compound. Moreover, the sensitivity to hydrogen of the catalyst is so low that the polyethylene formed has such a high molecular weight that it is unsuitable for processing by injection molding or extrusion.

8.7 g of the dried silicic acid according to Example 1 are suspended in 50 ml of n-heptane and 1.65 g of titanium tetrachloride (1 mmol per 1 g of silicic acid) are added. The mixture is heated at 90° C. while stirring under an argon atmosphere for a period of 7 hours. Heptane is then withdrawn in a rotary evaporator at 120° C. and the residue is dried for 0.5 hour at 80° C. under 2 torrs. 9.3 g of a powder having a titanium content of 47.4 mg per gram are obtained. Ethylene is polymerized in the presence of 1.05 g of the powder obtained under the same conditions as in Example 2. There are obtained 84 g of polyethylene having a bulk density of 378 g/l. A melt index $i_5$ or $i_{15}$ cannot be measured. The RSV is 14.5 dl/g. There are obtained 1,700 g of polyethylene per gram of titanium and 80 g per gram of the catalyst component A.

COMPARATIVE EXAMPLE D

Comparative Example C is repeated by suspending 10.1 g of the dried silicic acid according to Example 1 in 86 g (50 ml) of titanium tetrachloride (44.8 mmols per 1 gram of silicic acid) and by stirring the suspension for 4 hours at 120° C. in an argon stream to remove hydrogen chloride. The product obtained is washed seven times, each time with 80 ml of n-hexane, until 10 ml of the supernatant solution contain less than 0.001 mmol of titanium compound. At the end the solvent is distilled off at 100° C. under atmospheric pressure and the residue is dried for 0.5 hour at 80° C. and under a pressure of 0.5 torr. 10.8 g of a free flowing powder are obtained having a titanium content of 35.5 mg per gram.

Ethylene is polymerized in the presence of 1.45 g of the powder obtained under the conditions described in Example 2. There are obtained 130 g of polyethylene having a bulk density of 394 g/l. A melt index $i_5$ or $i_{15}$ cannot be measured. The RSV is 17.2 dl/g. There are obtained 2,500 g of polyethylene per gram of titanium and 90 g per gram of the catalyst component A.

COMPARATIVE EXAMPLE E

Comparative Example C is repeated by suspending 9.8 g of the dried silicic acid according to Example 1 in 50 ml of n-heptane, adding 18.6 g (10 mmols per 1 gram of silicic acid) of titanium tetrachloride and stirring the mixture for 7 hours at 90° C. The product obtained is washed five times with each time 80 ml of heptane until 10 ml of the supernatant solution contains less than 0.001 mmol of titanium compounds. At the end heptane is withdrawn in the rotary evaporator at 120° C. and the residue is dried for 0.5 hour at 80° C. under a pressure of 0.7 torr. 10.2 g of a free flowing powder are obtained having a titanium content of 37.7 mg per gram.

Ethylene is polymerized under the conditions of Example 2 in the presence of 1.21 g of said powder. There are obtained 118 g of polyethylene having a bulk density of 292 dl/g. A melt index $i_5$ and $i_{15}$ cannot be measured. The RSV is 12.2 dl/g. Per gram of titanium there are obtained 2,600 g, per gram of the catalyst component A 98 g of polyethylene.

EXAMPLE 10

8.2 g of the dried silicic acid, which has been reacted with n-propyl magnesium chloride according to Example 1 are suspended in 70 ml of n-heptane and 1.60 g (1.0 mmol per 1 g of silicic acid) of TiCl$_3$(OiC$_3$H$_7$) are added. The mixture is stirred for 6 hours at 90° C. The solvent is withdrawn in the rotary evaporator at 120° C. and the residue is dried for 0.5 hour at 80° C. under 2 torrs. 9.26 g of a free flowing powder are obtained having a titanium content of 39.4 mg per gram. Ethylene is polymerized under the conditions described in Example 2 in the presence of 0.44 g of the powder obtained. There are obtained 145 g of polyethylene having a melt index $i_5$ of 0.50 and a bulk density of 380 g/l. Per gram of titanium there are obtained 8,400 g of polyethylene, per gram of the catalyst component A, 330 g.

EXAMPLE 11

Ethylene is polymerized under the conditions described in Example 4 in the presence of 0.62 g of the catalyst component A prepared according to Example 10. There are obtained 186 g of polyethylene having a melt index $i_5$ of 0.70, $i_{15}$ of 4.57 and a bulk density of 367 g/l. Per gram of titanium there are obtained 7,600 g of polyethylene, per gram of component A, 300 g.

EXAMPLE 12

Polymerization of ethylene in the gaseous phase.

Ethylene is polymerized under the conditions of Example 3 in the presence of 2.4 g of the catalyst component A prepared according to Example 10. After 6 hours the pressure is 20.7 bars. There are obtained 14 kg of polyethylene having a melt index $i_5$ of 0.33 and a bulk density of 465 g/l. The polyethylene powder has a portion of fine particles having a diameter of less than 100 μm of 0.1% by weight. Per gram of titanium there are obtained 127,000 g, per gram of the catalyst component A, 5,833 g of polyethylene.

EXAMPLE 13

110 g of the dried silicic acid which has been reacted with n-propyl magnesium chloride according to Example 1 are suspended in 700 ml of n-heptane and 26 g (1 mmol of titanium per 1 gram of silicic acid charged with magnesium) of $TiCl_2(OiC_3H_7)_2$ are added. The mixture is stirred for 6 hours at 90° C. The solvent is withdrawn in the rotary evaporator at 120° C. and the residue is dried for 2 hours at 80° C. under 1 torr. There are obtained 124 g of a dry free flowing powder having a titanium content of 39.1 mg per gram.

Ethylene is polymerized under the conditions of Example 2 in the presence of 0.35 g of the powder obtained. There are obtained 130 g of polyethylene having a melt index $i_5$ of 2.1, $i_{15}$ of 15.8 and a bulk density of 390 g/l. The density is 0.960 g/cm³. Per gram of titanium there are obtained 9,500 g of polyethylene, per gram of the component A, 371 g of polyethylene.

EXAMPLE 14

Copolymerization of ethylene and butene-1.

100 liters of Diesel oil are placed in a 100 liter vessel, the contents of the vessel are heated to 85° C. and the air is displaced by flushing with nitrogen. 45.6 g of aluminum triethyl and 12.25 g of the catalyst component A prepared according to Example 13 are added. 5 kg of ethylene are introduced for a period of 6 hours and a quantity of hydrogen such that the hydrogen part in the gaseous phase is 15% by volume is introduced. Butene-1 is moreover introduced at a rate of 50 g/h. The pressure mounts to 5.2 bars in the course of the polymerization. The suspension is separated from the dispersing agent by a pressure filter and the polymer is dried in a fluidized bed dryer. There are obtained 28.5 kg of polyethylene having an RSV of 2.8 dl/g and a density of 0.946 g/cm³. The bulk density is 450 g/l. Per gram of titanium there are obtained 59,500 g of copolymer based on ethylene and butene-1, per gram of the catalyst component A, 2,326 gram of copolymer.

EXAMPLE 15

Ethylene is polymerized under the conditions of Example 4 in the presence of 0.56 g of the catalyst component A prepared according to Example 13. There are obtained 135 g of polyethylene having a melt index $i_5$ of 2.3 and a bulk density of 345 g/l. Per gram of titanium there are obtained 6,200 g, per gram of the component A, 241 g of polyethylene.

EXAMPLE 16

6.2 g of the dried silicic acid according to Example 1 are suspended in 50 ml of a solution of 9.1 mmols of t-butyl magnesium chloride (1.47 mmols per 1 gram of silicic acid) in diethyl ether and refluxed for one hour while stirring. The solvent is withdrawn in a rotary evaporator and the residue is dried for 2 hours at 120° C. under 0.3 torr. The dried solid is suspended in 50 ml of n-heptane, 1.17 g (1 mmol of titanium per 1 gram of silicic acid) of titanium-tetrachloride are added and the mixture is stirred for 6 hours at 90° C. Heptane is withdrawn in a rotary evaporator and the solid is dried for 2 hours at 120° C. under atmospheric pressure and for 0.5 hour at 80° C. under a pressure of 0.4 torr. There are obtained 7.7 g of a dry free flowing powder having a titanium content of 38.5 mg per gram. The atomic ratio of magnesium and titanium is 1.5:1.

Ethylene is polymerized under the conditions of Example 2 in the presence of 0.42 g of the powder prepared. There are obtained 212 g of polyethylene having a melt index $i_5$ of 0.26 and $i_{15}$ of 1.7. The bulk density is 364 g/l. Per gram of titanium there are obtained 1,300 g of polyethylene, per gram of the component A, 504 g of polyethylene.

EXAMPLE 17

A porous silicic acid having a specific surface of about 300 m²/g, a pore volume of 1.65 cm³/g and an average particle size of 50 μm is dried for 4 hours in a fluidized bed in an argon flow, at 350° C. and thereafter allowed to stand under an argon atmosphere. The silicic acid contains thereafter 1.9 mmols of hydroxyl groups per gram. 9.94 g of the silicic acid obtained are suspended in 30 ml of diethyl ether. 49 ml of a solution of 18.2 mmols (1.83 mmols of magnesium per 1 g of silicic acid) of phenyl magnesium bromide in diethyl ether are added and the mixture is heated while refluxing. The solvent is withdrawn in the rotary evaporator and the solid matter is dried for 2 hours at 120° C. under 0.3 torr. The pretreated silicic acid is suspended in 50 ml of n-heptane and 1.89 g of titanium tetrachloride (1.0 mmol per 1 g of silicic acid) are added. The mixture is stirred for 4 hours at 90° C., the solvent is withdrawn and the residue is dried for one hour at 80° C. under 0.8 torr. There are obtained 12.6 g of a flowable powder having a titanium content of 36.8 mg per gram. The atomic ratio of magnesium/titanium is 1.8:1.

Ethylene is polymerized under the conditions of Example 2 in the presence of 0.45 g of the powder prepared. There are obtained 175 g of polyethylene having a melt index $i_5$ of 1.73 and $i_{15}$ of 12.6. The bulk density is 355 g/l, the air permeability of the powder 0.0058 cm³·sec/g. Per gram of titanium there are obtained 10,600 g of polyethylene, per gram of the component A, 390 g of polyethylene.

EXAMPLE 18

Ethylene is polymerized under the conditions of Example 4 by means of 0.48 g of the catalyst component A prepared according to Example 17. There are obtained 224 g of polyethylene having a melt index $i_5$ of 2.1 and $i_{15}$ of 12.9. The bulk density is 340 g/l, the air permeability of the powder 0.077 cm³·sec/g. Per gram of titanium there are obtained 12,700 g, per gram of the component A, 467 g, of polyethylene.

EXAMPLE 19

A porous aluminum silicate (85.7% of $SiO_2$ and 14.2% of $Al_2O_3$) having a specific surface of about 550 m²/g, a pore volume of 0.71 cm³/g and an average particle size of 135 μm is dried in a fluidized bed in an argon flow for 4 hours, at 460° C. and kept under an argon atmosphere. Thereafter it contains 3.0 mmols of hydroxyl groups per gram.

600 g of the silicate obtained are suspended in 3 liters of diethyl ether, 1.3 liters of a solution of 1.79 mols (2.98 mmols per 1 g of silicate) of n-propyl magnesium chloride in diethyl ether are added and the mixture is refluxed for one hour while stirring. After settling of the solid matter no magnesium can be detected in the supernatant solution. The solvent is withdrawn in the rotary evaporator and the residue is dried for 2 hours at 120° C. under 0.5 torr. The carrier pretreated is suspended in 5 liters of cyclohexane, 182 g of titanium tetrachloride (1.6 mmols of titanium per 1 g of silicic acid) are added in 2 hours and the mixture is stirred for 6 hours at 100° C.

The solvent is withdrawn at 120° C. and the residue is dried for one hour at 90° C. under a pressure of 0.5 torr. There are obtained 880 g of a flowable powder having a titanium content of 51.2 mg per gram. The atomic ratio between magnesium and titanium is 1.86:1.

Ethylene is polymerized under the conditions of Example 2 in the presence of 0.23 g of said catalyst component A. There are obtained 169 g of polyethylene having a melt index $i_5$ of 0.85 and a bulk density of 315 g/l. Per gram of titanium there are obtained 14,400 g, per gram of the component A, 735 g, of polyethylene

EXAMPLE 20

Polymerization of ethylene in the gaseous phase.

2 kg of polyethylene ($i_5 = 10.8$, bulk density 410 g/l) are placed in a lying 80 liter reactor, which is provided with a scraping stirrer. The reactor is liberated from air by evacuating several times and by flushing for several hours with an ethylene/hydrogen mixture and heated thereafter to 90° C. 17.1 g aluminum triethyl and 2.8 g of the catalyst component A prepared according to Example 19 are thereafter placed in the reactor. Ethylene is introduced into the reactor at a rate of 2 kg/hour for a period of 6 hours and hydrogen is introduced until the hydrogen portion is 20% by volume. The polymerization temperature is 105° C. The pressure mounts in the course of the polymerization to 9.8 bars. 14 kg of polyethylene are obtained having a melt index $i_5$ of 0.98 and a bulk density of 415 g/l. Per gram of titanium there are obtained 83,700 g of polyethylene, per gram of the component A, 5,000 g of polyethylene.

What is claimed is:

1. In a process for the preparation of a catalyst by reacting the reaction product of silicon dioxide, aluminum oxide, or a mixture thereof, and (a) a halogen-containing magnesium-organic compound and (b) a halogen compound of a transition metal, with an aluminum-organic compound, the improvement which comprises (1) reacting silicon dioxide, aluminum oxide, or a mixture thereof, having a content of hydroxyl groups of from 0.5 to 50 mmols/g, in the presence of a diluent, with a magnesium-organic compound of the formula RMgX, wherein R is hydrocarbon of from 1 to 20 carbon atoms and X is chlorine, bromine or iodine, in an amount of from 0.1 to 0.95 mol of said magnesium-organic compound per mol of hydroxyl groups of the silicon dioxide, aluminum oxide or mixture thereof;

(2) reacting the solid reaction product of step (1) in suspension with a halogen-containing titanium compound of the formula $TiX_n(OR^1)_{4-n}$, wherein n is an integer of from 1 to 4, X is chlorine or bromine and $R^1$ is hydrocarbon of from 1 to 12 carbon atoms, in an amount of from 0.01 to 1 mol of said titanium compound per mol of hydroxyl groups of the silicon dioxide, aluminum oxide or mixture thereof, and in an amount such that the atomic ratio of magnesium to titanium in the reaction product is in the range of from 0.1 to 10; and (3) reacting the product of step (2) with a sufficient amount of an aluminum-organic compound which is a compound of the formula $AlR_3^6$ or $AlR_2^6H$, $R^6$ being hydrocarbon of from 1 to 16 carbon atoms, a compound of the formula $R_2^5AlCl$ or $R_3^5Al_2Cl_3$, $R^5$ being hydrocarbon of from 1 to 16 carbon atoms, or a product of the reaction of an aluminum trialkyl or an aluminum dialkyl hydride, wherein said alkyl is of from 1 to 16 carbon atoms, with a diene of from 4 to 20 carbon atoms to produce a catalyst which is active in polymerizing a 1-olefin.

2. The process as defined in claim 1 wherein the product of step (2) and the aluminum-organic compound are reacted during polymerization and the product of step (2) is present in an amount of from 0.005 to 1.5 mmols per liter of reactor volume or an inert solvent dispersing agent and the aluminum-organic compound is present in an amount of from 0.5 to 10 mmols per liter of said reactor volume or said inert solvent dispersing agent.

3. The process as defined in claim 2 wherein the product of step (2) and the aluminum-organic compound are reacted before polymerization and the product of step (2) is reacted in a molar ratio to the aluminum-organic compound of from 1:0.2 to 1:3.

4. A compound prepared according to the process as defined in claim 1.

5. A process as defined in claim 1, wherein said silicon dioxide, aluminum oxide, or mixture thereof, has a content of hydroxyl of from 1 to 20 mmols/g.

6. A compound prepared according to the process as defined in claim 5.

7. The process as defined in claim 1, wherein R is hydrocarbon of from 2 to 10 carbon atoms.

8. A compound prepared according to the process as defined in claim 7.

9. The process as defined in claim 1, wherein said magnesium compound is added at a temperature of from −20° to 150° C. and reacts with the silicon dioxide, aluminum oxide, or mixture thereof, for a period of from 0.5 to 20 hours; and the product of such reaction is reacted with said halogen-containing titanium compound at a temperature of from 20° to 140° C.

10. A compound prepared according to the process as defined in claim 9.

11. The process as defined in claim 1, wherein $R^1$ is alkyl of up to 12 carbon atoms, aryl of up to 12 carbon atoms or aralkyl of up to 12 carbon atoms.

12. A compound prepared according to the process as defined in claim 11.

13. The process as defined in claim 11, wherein $R^1$ is straight or branched alkyl of from 1 to 8 carbon atoms.

14. A compound prepared according to the process as defined in claim 13.

15. A process as defined in claim 1, wherein $R^5$ and $R^6$ are alkyl of from 1 to 16 carbon atoms.

16. A compound prepared according to the process as defined in claim 15.

17. The process as defined in claim 15, wherein the alkyl of the aluminum trialkyl or the aluminum dialkyl hydride is of from 4 to 8 carbon atoms and the diene is phellandrene or of the formula

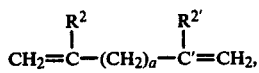

wherein $R^2$ and $R^{2'}$ each is hydrogen, alkyl, alkylene having a non-terminal double bond or mononuclear aryl, and a is 0 or 1.

18. A compound prepared according to the process as define in claim 17.

19. The process as defined in claim 15, wherein the said aluminum trialkyl is aluminum triisobutyl, said aluminum dialkyl hydride is aluminum diisobutyl hydride and said diene is isoprene.

20. A compound prepared according to the process as defined in claim 19.

21. The process as defined in claim 15, wherein said silicon dioxide, aluminum oxide, or mixture thereof, has a content of hydroxyl of from 1 to 20 mmols/g.

22. A compound prepared according to the process as defined in claim 21.

23. The process as defined in claim 15, wherein R is hydrocarbon of from 2 to 10 carbon atoms.

24. A compound prepared according to the process as defined in claim 23.

25. The process as defined in claim 15, wherein said magnesium compound is added at a temperature of from −20° to 150° C. and reacts with the silicon dioxide, aluminum oxide, or mixture thereof, for a period of from 0.5 to 20 hours, and the product of such reaction is reacted with said halogen-containing titanium compound at a temperature of from 20° to 140° C.

26. A compound prepared according to the process as defined in claim 25.

27. The process as defined in claim 15, wherein $R^1$ is alkyl of up to 12 carbon atoms, aryl of up to 12 carbon atoms or aralkyl of up to 12 carbon atoms.

28. A compound prepared according to the process as defined in claim 27.

29. The process as defined in claim 27, wherein $R^1$ is straight or branched alkyl of from 1 to 8 carbon atoms.

30. A compound prepared according to the process as defined in claim 21.

* * * * *